United States Patent
Beutnagel et al.

(10) Patent No.: US 8,904,276 B2
(45) Date of Patent: Dec. 2, 2014

(54) PARTITIONING OF MARKUP LANGUAGE DOCUMENTS

(75) Inventors: Mark C. Beutnagel, Mendham, NJ (US); Alistair D. Conkie, Morristown, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 918 days.

(21) Appl. No.: 12/272,617

(22) Filed: Nov. 17, 2008

(65) Prior Publication Data

US 2010/0125783 A1    May 20, 2010

(51) Int. Cl.
*G06F 17/00* (2006.01)
*G06F 17/27* (2006.01)

(52) U.S. Cl.
CPC ............................ *G06F 17/272* (2013.01)
USPC .................. 715/234; 715/237; 715/239

(58) Field of Classification Search
None
See application file for complete search history.

(56) References Cited

U.S. PATENT DOCUMENTS

| | | | |
|---|---|---|---|
| 6,393,466 B1 | 5/2002 | Hickman et al. | |
| 6,636,845 B2 | 10/2003 | Chau et al. | |
| 6,643,633 B2 | 11/2003 | Chau et al. | |
| 6,708,186 B1 | 3/2004 | Claborn et al. | |
| 6,708,217 B1 * | 3/2004 | Colson et al. | 709/231 |
| 6,721,727 B2 | 4/2004 | Chau et al. | |
| 6,976,020 B2 | 12/2005 | Anthony et al. | |
| 7,017,293 B2 | 3/2006 | Riley | |
| 7,096,224 B2 | 8/2006 | Murthy et al. | |
| 7,174,327 B2 | 2/2007 | Chau et al. | |
| 7,210,136 B2 | 4/2007 | Swett | |
| 7,221,801 B2 | 5/2007 | Jang et al. | |
| 7,251,642 B1 | 7/2007 | Szeto | |
| 2002/0049749 A1 | 4/2002 | Helgeson et al. | |
| 2002/0123993 A1 | 9/2002 | Chau et al. | |
| 2002/0133484 A1 | 9/2002 | Chau et al. | |
| 2002/0143816 A1 | 10/2002 | Geiger et al. | |
| 2002/0143944 A1 | 10/2002 | Traversat et al. | |
| 2002/0156772 A1 | 10/2002 | Chau et al. | |
| 2003/0014397 A1 | 1/2003 | Chau et al. | |
| 2003/0069908 A1 | 4/2003 | Anthony et al. | |
| 2003/0140308 A1 | 7/2003 | Murthy et al. | |
| 2003/0221169 A1 | 11/2003 | Swett | |
| 2004/0111676 A1 | 6/2004 | Jang et al. | |
| 2004/0199430 A1 | 10/2004 | Hsieh | |
| 2005/0102652 A1 | 5/2005 | Sulm et al. | |
| 2005/0132342 A1 | 6/2005 | Van Lunteren | |

(Continued)

OTHER PUBLICATIONS

Burnett et al.; "Speech Synthesis Markup Language (SSML) Version 1.0"; Sep. 7, 2004; W3C (available at http://www.w3.org/TR/2004/REC-speech-synthesis-20040907).*

(Continued)

*Primary Examiner* — Stephen Hong
*Assistant Examiner* — Asher Kells
(74) *Attorney, Agent, or Firm* — Scott P. Zimmerman, PLLC

(57) ABSTRACT

A process and system for partitioning hybrid markup language documents (HMLDs) is disclosed. Content from an HMLD is copied to one or more output markup language documents (MLDs), which may be well-formed or valid MLDs. The HMLD is segmented at partition boundaries within the document, while state information is recorded in a tag stack. The state information is used to complete the output MLD, which may be sent to a software module for processing. The HMLDs and MLDs may be well-formed or valid extensible markup language (XML) documents.

20 Claims, 4 Drawing Sheets

(56) References Cited

U.S. PATENT DOCUMENTS

| | | |
|---|---|---|
| 2005/0137998 A1 | 6/2005 | Betts |
| 2005/0138547 A1 | 6/2005 | Muhanna et al. |
| 2005/0157660 A1 | 7/2005 | Mandato et al. |
| 2005/0165866 A1 | 7/2005 | Bohannon et al. |
| 2005/0228792 A1 | 10/2005 | Chandrasekaran et al. |
| 2005/0234844 A1 | 10/2005 | Ivanov |
| 2006/0069985 A1* | 3/2006 | Friedman et al. ............ 715/513 |
| 2006/0117307 A1 | 6/2006 | Averbuch et al. |
| 2006/0136914 A1 | 6/2006 | Marascio et al. |
| 2006/0173875 A1 | 8/2006 | Stefaniak |
| 2006/0242598 A1 | 10/2006 | Marascio et al. |
| 2006/0248448 A1 | 11/2006 | Williams et al. |
| 2006/0248449 A1 | 11/2006 | Williams et al. |
| 2006/0248450 A1 | 11/2006 | Wittenberg et al. |
| 2006/0248451 A1 | 11/2006 | Szyperski et al. |
| 2006/0262915 A1 | 11/2006 | Marascio et al. |
| 2007/0006068 A1* | 1/2007 | Kren .............................. 715/513 |
| 2007/0044066 A1 | 2/2007 | Meijer et al. |
| 2007/0143124 A1 | 6/2007 | Blouin et al. |
| 2007/0150443 A1 | 6/2007 | Bergholz et al. |
| 2007/0220342 A1 | 9/2007 | Vieira et al. |
| 2007/0226635 A1* | 9/2007 | Goebel et al. ................. 715/745 |
| 2007/0299811 A1 | 12/2007 | Chandrasekar et al. |
| 2008/0005093 A1 | 1/2008 | Liu et al. |
| 2008/0040498 A1 | 2/2008 | Setlur et al. |
| 2008/0120283 A1 | 5/2008 | Liu et al. |
| 2008/0250057 A1 | 10/2008 | Rothstein et al. |

OTHER PUBLICATIONS

"Removing XML comments with regex"; Oct. 24, 2007; PerlMonks (available at http://www.perlmonks.org/?node_id=646970).*

\* cited by examiner

PARTITIONING OF MARKUP LANGUAGE DOCUMENTS

BACKGROUND

1. Field of the Disclosure

The present disclosure relates to document processing and, more particularly, the partitioning of markup language documents.

2. Description of the Related Art

Many different software components process markup language documents. A hybrid markup language document may, in one example, include markup language instructions for different software components in different sections of the document.

DESCRIPTION OF THE EMBODIMENT(S)

Figure 1:
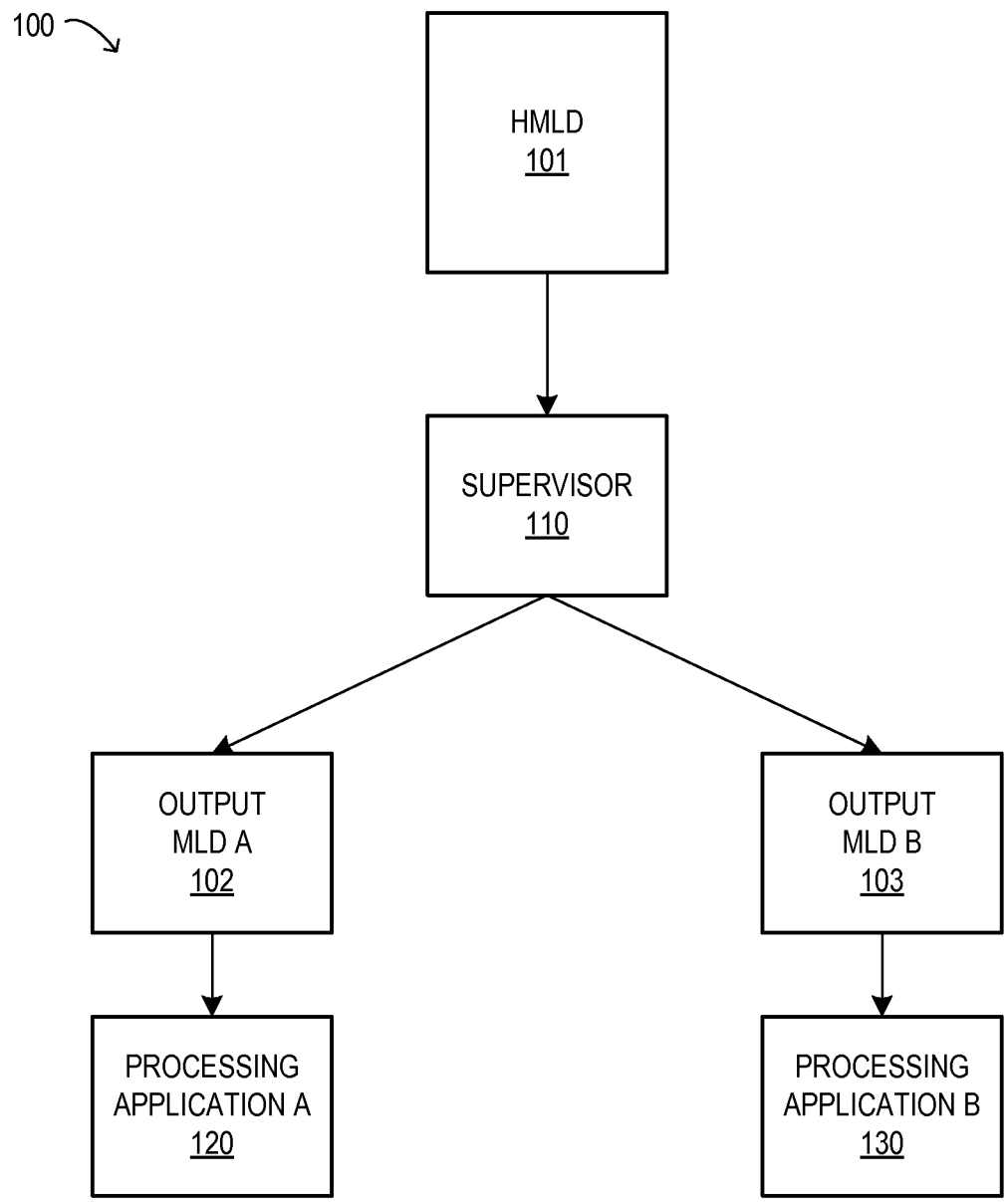
FIG. 1 is a block diagram of selected elements of an embodiment of a partitioning system.

In one aspect, a disclosed method for partitioning hybrid markup language documents (HMLDs) includes scanning an HMLD and recording state information in a single tag stack. A markup language document may be "hybrid" by design (e.g., two or more types of data may be mixed in one data stream) or a markup language document may be viewed as "hybrid" in order to match available applications such as single-language synthesizers. In response to detecting a partition boundary in the HMLD during said scanning, the method may further include selecting HMLD content based on its position relative to the partition boundary and including the selected content in an output markup language document (MLD), and using the tag stack to update state information in the output MLD. The output MLD may be stored on a storage device or output for display on a display device. In some embodiments, the output MLD is at least one of a well-formed MLD and a valid MLD. The partition boundary may be a tag attribute. The state information may include opening tags and corresponding closing tags, while the HMLD may be at least one of a well-formed MLD and a valid MLD.

In some cases, said scanning may further comprise adding an opening tag detected in the HMLD to the tag stack, and upon detecting a closing tag corresponding to the opening tag, removing the opening tag from the tag stack. In instances wherein the selected portion comprises a scanned portion, the method may further include bifurcating the scanned portion and an unscanned portion, and repeating portions of the method described herein on the unscanned portion. In some embodiments, said including content from the HMLD may further comprise filtering at least some content from the HMLD out of the output MLD.

The HMLD may be a speech synthesis markup language (SSML) document while the content filtered out of the output MLD may include non-SSML tags or may include content not intended for conversion to audio such as comments or notations. The partition boundary may demarcate a change in at least one of a language and speaker. In some cases, the output MLD may be an SSML document, and the method may further include sending the output MLD to a text-to-speech system, wherein an audio speech signal is synthesized using the output MLD.

In still another aspect, a disclosed computer-readable memory media includes processor executable instructions for partitioning HMLDs. The instructions may be executable to parse an HMLD, wherein state information for the HMLD is recorded in a single tag stack. In alternative embodiments, multiple tag stacks may be utilized. In response to parsing a partition boundary in the HMLD, the instructions may further be executable to copy HMLD content prior to the partition boundary to an output MLD, and use the tag stack to rectify state information in the output MLD, wherein the output MLD comprises at least one of a well-formed MLD and a valid MLD.

In some embodiments, the output MLD is an extensible markup language (XML) document in compliance with a defined schema format for XML. The defined schema format for XML may be the Document Type Definition (DTD). The instructions executable to copy markup language from the HMLD may further include instructions executable to omit at least some markup language from the HMLD in the output MLD. The markup language omitted in the output MLD may include comment lines in the HMLD. In some embodiments, the HMLD and the output MLD may be SSML documents, while the markup language omitted in the output MLD may include non-SSML tags or may include content not intended for conversion to audio such as comments or notations. The instructions may further be executable to use at least one of the HMLD and the output MLD to synthesize speech audio signals. The partition boundary may demarcate a change in an audio property of the synthesized speech. In some cases, the audio property is selected from the group consisting of: language, accent, dialect, gender of the speaker, rate of speech, and country of the language.

In yet another aspect, a disclosed device for partitioning HMLDs comprises a processor and memory media accessible to the processor, including processor executable instructions. The instructions may be executable to scan an HMLD to detect one or more partition boundaries, and parse the HMLD prior to a first partition boundary, wherein state information for the HMLD is recorded in a first tag stack. The instructions may further be executable to copy markup language from the HMLD prior to the first partition boundary to a first MLD, and use the first tag stack to rectify state information in the first MLD, wherein the first MLD comprises at least one of well-formed markup language and valid markup language.

In some instances, the instructions may further be executable to parse the HMLD prior to a second partition boundary and subsequent to the first partition boundary, wherein state information for the HMLD is recorded in a second tag stack, and copy markup language from the HMLD prior to the second partition boundary and subsequent to the first partition boundary to a second MLD. The second tag stack may be used to rectify state information in the second MLD, wherein the second MLD comprises at least one of well-formed markup language and valid markup language.

In some cases, the instructions may further be executable to initialize the second tag stack using a list of open tags from the first tag stack, with respect to the location of the first partition boundary in the HMLD. Some instructions may still further be executable to add an opening tag detected in the HMLD to the first tag stack, and upon detecting a closing tag corresponding to the opening tag, remove the opening tag from the first tag stack.

In the following description, details are set forth by way of example to facilitate discussion of the disclosed subject matter. It should be apparent to a person of ordinary skill in the field, however, that the disclosed embodiments are exemplary and not exhaustive of all possible embodiments.

A markup language is used to identify structures present within electronic data. XML is a markup language having a standardized format capable of describing structured data. "Structured data" may include electronic data including, but not limited to, purchase orders, spreadsheets, address books, configuration parameters, financial transactions and technical drawings. Programs capable of producing structured data typically store the data upon a computer readable medium using a text format.

XML is extensible in that it is not a fixed format. Unlike hypertext markup language (HTML), which is best described as a single, predefined markup language, XML is actually a "metalanguage" capable of describing other languages. This feature of XML allows the design of customized markup languages for a variety of document types. XML provides a set of standardized rules, guidelines and/or conventions for designing text formats for structured data. The inherent tagging system of XML denotes specific fields of information that can be exploited to load XML data into other applications for additional processing.

As a standardized format defined by the World Wide Web Consortium (W3C), XML demands adherence to specific structure and formatting rules in order to maintain compatibility among other applications. One desired property for markup languages, such as XML, is having syntax that is "well-formed" or in compliance with syntax rules. For example, a well-formed element, or "tag", in a markup language is one that is either opened and subsequently closed or an empty element that is terminated. Another property of well-formed elements is that they are properly nested without overlap of opening and closing tags.

A further property of correctness, or standardization, of markup language documents, such as XML documents, is having "valid" documents, which conform to semantic rules. The semantic rules, while they may be user-defined or included as a standardized document schema, should be explicitly defined. An example of an XML schema is the DTD, which describes the structure of a class of documents using element and attribute-list declarations.

There are situations in which markup language documents contain information, such as tags, for a number of different target applications. Each target application may be configured to receive specific tags or tag attributes, or even have its own syntax definitions. Such a document is referred to herein as an HMLD. An HMLD, which may be an XML document, could be of arbitrarily large size and complexity.

One method to distribute the content in an HMLD into subcomponents for each target application would be to parse the contents and distribute the parsed subcomponents. However, the integration of different target applications may not be practical using parsed subcomponents of the HMLD, because different target applications may have specific, even conflicting, expectations for the format of the parsed subcomponents. Adding new target applications may further introduce unknown complexity. Further, the task of parsing a large HMLD may introduce processing delays that are not reasonable for certain applications, for example, speech synthesis.

Turning now to the drawings, FIG. 1 is a block diagram of selected elements of an embodiment of a document partitioning system 100. The system 100 is configured to partition an HMLD into one or more output MLDs. The HMLD, as well as the output MLDs, may be well-formed or valid MLDs. In some embodiments, the HMLD and the output MLDs are XML documents. Accordingly, the output MLDs may be sent to processing applications that expect well-formed or valid MLDs according to a document schema.

In FIG. 1, HMLD 101 is delivered to supervisor 110, which represents a computing device or a processing module, such as a network service. In some embodiments, supervisor 110 is a portable application that is executable in a desired computing environment. In the example embodiment of system 100 shown in FIG. 1, supervisor 110 receives HMLD 101 and generates output MLD A 102 and output MLD B 103 by partitioning HMLD 101. That is, content from HMLD 101 may be copied, or translated, into output MLD A 102 and MLD B 103. Output MLD A 102 may be sent to processing application A 120, while output MLD B 103 may be sent to processing application B 130. Since output MLDs may be well-formed or valid MLDs, such as XML documents, the expectations of a wide range of processing applications for input documents may be met.

A further attribute of system 100 is that supervisor 110 may dispatch output MLDs in a synchronous or asynchronous manner. In other words, the processing of HMLD 101 may be performed in a controlled and efficient manner, since HMLD 101 is partitioned in a single operation, regardless of the complexity of the overall system. Although shown with two output MLDs (MLD A 102 and MLD B 103) in FIG. 1 for clarity, it is noted that the number of output MLDs, or processing applications, in a given implementation of system 100 may be arbitrarily large and complex.

Figure 2:
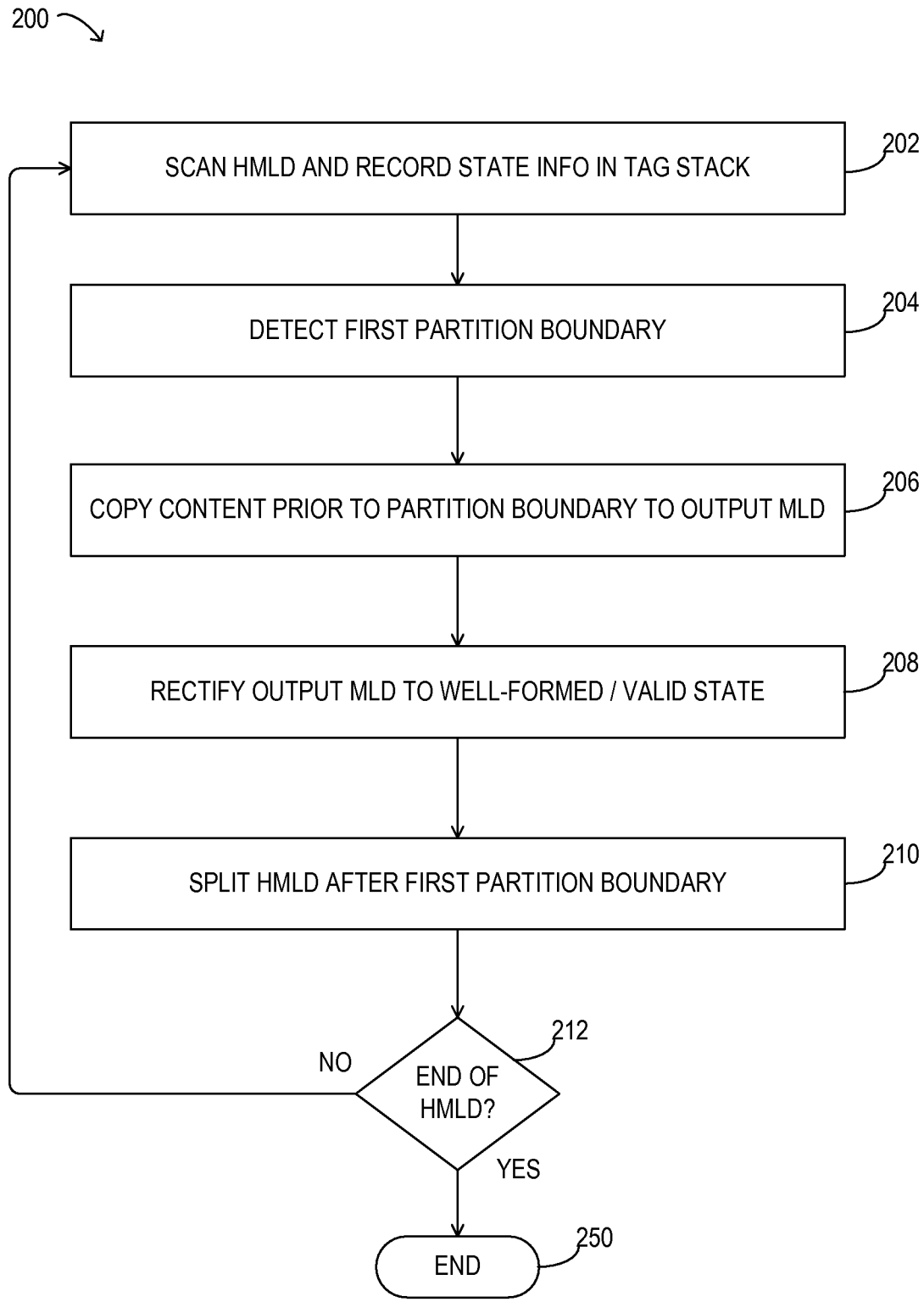
FIG. 2 is a block diagram of selected elements of an embodiment of a partitioning process.

Referring now to FIG. 2, a block diagram of selected elements of an embodiment of a partitioning process 200 is depicted. Process 200 is representative of operations executable by supervisor 110 as described above with respect to FIG. 1. An HMLD may be scanned, while state information is recorded in a tag stack (operation 202). In different embodiments, the HMLD may be scanned block-wise or continuously in operation 202. In some instances, the HMLD may be scanned in a forward direction from a starting point.

During operation 202, the tag stack may record each opening and closing tag discovered during scanning of the HMLD. In some embodiments, state information is preserved in the tag stack by processing opening and closing tags. The tag stack may further include an indication of tags that have been opened but not closed during scanning. In one embodiment, opening tags are deleted from the tag stack when a corresponding closing tag is detected.

During scanning, a first partition boundary may be detected (operation 204). The partition boundary may be a tag or a tag attribute. Entries in a document schema may define the format and enumerations of partition boundaries, including which partitions are associated with which target processing applications. Partition boundaries may also be selectively designated without regard to the particular document schema and be defined according to character, word, or item count or other selected factors. Content from the HMLD prior to the partition boundary may then be copied to an output MLD (operation 206). In some embodiments, content may be further processed in operation 206, i.e., translated, reformatted, etc., prior to inclusion in the output MLD. The output MLD may further be rectified to a well-formed or valid state (operation 208). In some embodiments, the tag stack is used to generate closing tags in the output MLD for all open tags in the copied content in operation 208.

The HMLD may then be split after the first partition boundary (operation 210). In some embodiments, HMLD content prior to the first partition boundary is discarded in operation 210. The remaining, i.e., not yet discarded, portion of the HMLD may then further be processed as described above. In other words, the remaining portion of the HMLD after the split may replace the original HMLD in a further processing iteration of process 200. A decision is made whether the end of the HMLD has been reached (operation 212). If the result of the decision in operation 212 is NO, then a further iteration of process 200 loops back to operation 202. If the result of operation 212 is YES, then the entire HMLD has been processed, and process 200 ends (operation 250).

Figure 3:
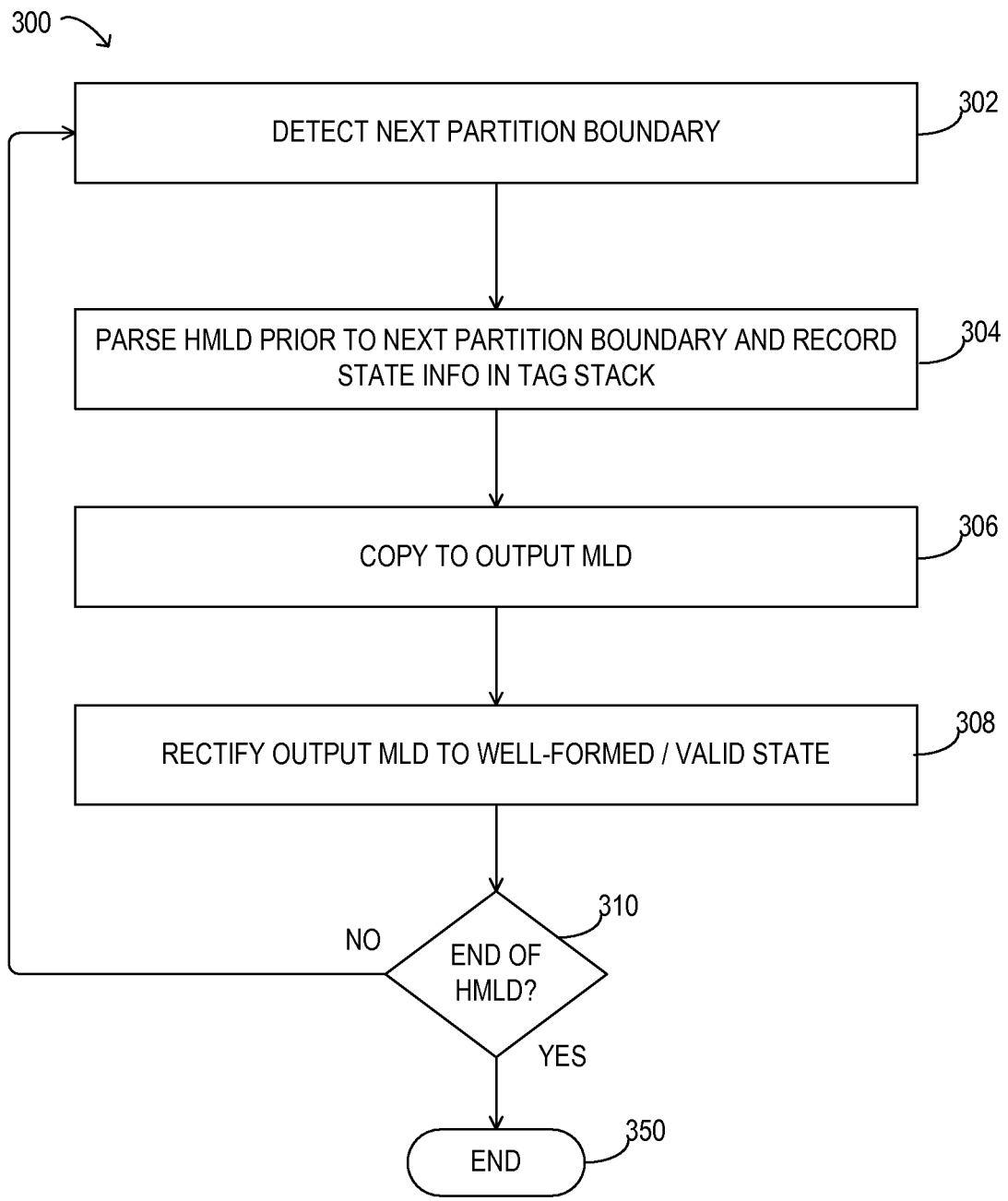
FIG. 3 is a block diagram of selected elements of an embodiment of a partitioning process.

Referring now to FIG. 3, a block diagram of selected elements of an embodiment of a partitioning process 300 is depicted. Process 300 is representative of operations executable by supervisor 110 as described above with respect to FIG. 1. Process 300 may be implemented as an alternative embodiment to process 200 shown in FIG. 2. An HMLD may be scanned from a given location and a next partition boundary is detected (operation 302). The HMLD may then be parsed prior to the next partition boundary (operation 304). In some embodiments, a section of the HMLD subsequent to the previous partition boundary, and prior to the next partition boundary is parsed in operation 304. Accordingly, process 300 may include recording the locations of each partition boundary, for example, in operation 302. The parsed content from the HMLD may be copied to an output MLD (operation 306). In some embodiments, operation 306 may be substantially similar to operation 206 described above with respect to FIG. 2. The output MLD may further be rectified to a well-formed or valid state (operation 308). In some implementations, operation 308 may be substantially similar to operation 208 described above with respect to FIG. 2.

A decision is made whether the end of the HMLD has been reached (operation 310). If the result of the decision in operation 310 is NO, then a further iteration of process 300 loops back to operation 302. If the result of operation 310 is YES, then the entire HMLD has been processed, and process 300 ends (operation 350). It is noted that the HMLD may remain intact during process 300.

Figure 4:
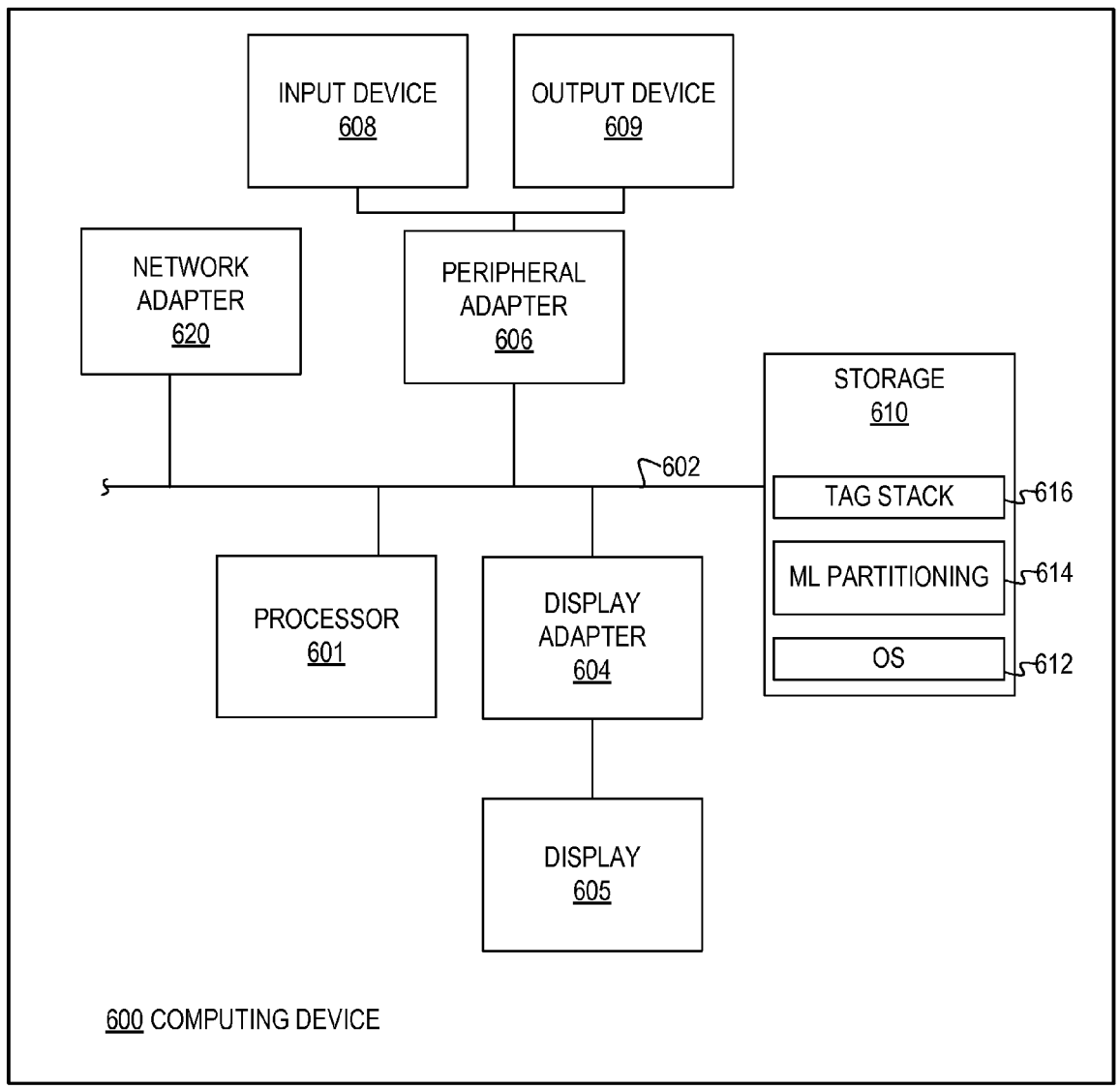
FIG. 4 is a block diagram of selected elements of an embodiment of a computing device.

Referring now to FIG. 4, a block diagram illustrating selected elements of an embodiment of a computing device 600 is presented. In the embodiment depicted in FIG. 4, device 600 includes processor 601 coupled via shared bus 602 to storage media collectively identified as storage 610.

Device 600, as depicted in FIG. 4, further includes network adapter 620 that interfaces device 600 to a network (not shown in FIG. 4). In embodiments suitable for use in document translation, device 600, as depicted in FIG. 4, may include peripheral adapter 606, which provides connectivity for the use of input device 608 and output device 609. Input device 608 may represent a device for user input, such as a keyboard or a mouse, or even a video camera. Output device 609 may represent a device for providing signals or indications to a user, such as loudspeakers for generating audio signals.

Device 600 is shown in FIG. 4 including display adapter 604 and further includes a display device or, more simply, a display 605. Display adapter 604 may interface shared bus 602, or another bus, with an output port for one or more displays, such as display 605. Display 605 may be implemented as a liquid crystal display screen, a computer monitor, a television or the like. Display 605 may comply with a display standard for the corresponding type of display. Standards for computer monitors include analog standards such as VGA, XGA, etc., or digital standards such as DVI, HDMI, among others. A television display may comply with standards such as NTSC (National Television System Committee), PAL (Phase Alternating Line), or another suitable standard. Display 605 may include an output device 609, such as one or more integrated speakers to play audio content, or may include an input device 608, such as a microphone or video camera.

Storage 610 encompasses persistent and volatile media, fixed and removable media, and magnetic and semiconductor media. Storage 610 is operable to store instructions, data, or both. Storage 610 as shown includes sets or sequences of instructions, namely, an operating system 612, a markup language application program identified as 614, and a tag stack 616. Operating system 612 may be a UNIX or UNIX-like operating system, a Windows® family operating system, or another suitable operating system.

In some embodiments, storage 610 is configured to store and provide executable instructions for partitioning markup language documents, as mentioned previously. In some instances, tag stack 616 is configured to record state information in HMLDs during partitioning, comparable to operation 202 in FIG. 2 and operation 304 in FIG. 3. As shown in FIG. 4, device 600 is configured in some embodiments to execute instructions for partitioning HMLDs using markup language application 614, analogous to process 200 depicted in FIG. 2 and process 300 of FIG. 3. In some cases, supervisor 110 in FIG. 1 is embodied by device 600, or by markup language application 614.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for partitioning a document, the method comprising:
    while scanning a hybrid markup language document:
    recording, by a processor, opening tags in a tag stack;
    deleting, by the processor, a selected opening tag from the tag stack responsive to detecting a closing tag corresponding to the selected opening tag;
    responsive to detecting a first partition boundary:
    copying, by the processor, content in the hybrid markup language document that precedes the first partition boundary to an output markup language document;
    splitting, by the processor, the hybrid markup language document at the first partition boundary, wherein the splitting comprises discarding the content in the hybrid markup language document that precedes the first partition boundary and replacing the content in the output markup language document with remaining content occurring after the first partition boundary; and
    generating, by the processor, closing tags corresponding to the opening tags in the remaining content in the output markup language document.

2. The method of claim 1, further comprising formatting the remaining content in the output markup language document as a valid markup language document.

3. The method of claim 1, wherein the first partition boundary is a tag attribute.

4. The method according to claim 1, further comprising demarcating a change in speaker at the first partition boundary.

5. The method according to claim 1, further comprising sending the remaining content in the output markup language document to a text-to-speech system.

6. The method according to claim 1, further comprising performing a text-to-speech conversion of the remaining content in the output markup language document.

7. The method according to claim 1, further comprising recording state information in the tag stack.

8. A system, comprising:
a processor; and
a memory storing instructions which when executed cause the processor to perform operations, the operations comprising:
scanning a hybrid markup language document;
detecting opening tags in the hybrid markup language document;
recording the opening tags in a tag stack;
detecting a closing tag that corresponds to one of the opening tags;
deleting the one of the opening tags from the tag stack responsive to detecting the closing tag;
detecting a first partition boundary in the hybrid markup language document;
copying, to an output markup language document, content in the hybrid markup language document that precedes the first partition boundary;
splitting the hybrid markup language document at the first partition boundary, wherein the splitting comprises discarding the content in the hybrid markup language document that precedes the first partition boundary and replacing the content copied to the output markup language document with remaining content occurring after the first partition boundary; and
generating closing tags corresponding to the opening tags that remain in the remaining content in the output markup language document.

9. The system according to claim 8, wherein the operations further comprise formatting the remaining content in the output markup language document as a valid markup language document.

10. The system according to claim 8, wherein the operations further comprise determining the first partition boundary is a tag attribute.

11. The system according to claim 8, wherein the operations further comprise demarcating a change in speaker at the first partition boundary.

12. The system according to claim 8, wherein the operations further comprise sending the remaining content in the output markup language document to a text-to-speech system.

13. The system according to claim 8, wherein the operations further comprise performing a text-to-speech conversion of the remaining content in the output markup language document.

14. The system according to claim 8, wherein the operations further comprise recording state information in the tag stack.

15. A non-transitory memory storing instructions that when executed cause a processor to perform operations, the operations comprising:
scanning a hybrid markup language document;
detecting opening tags in the hybrid markup language document;
recording the opening tags in a tag stack;
detecting a closing tag that corresponds to one of the opening tags;
deleting the one of the opening tags from the tag stack responsive to detecting the closing tag;
detecting a first partition boundary in the hybrid markup language document;
copying, to an output markup language document, content in the hybrid markup language document that precedes the first partition boundary;
splitting the hybrid markup language document at the first partition boundary, wherein the splitting comprises discarding the content in the hybrid markup language document that precedes the first partition boundary and replacing the content copied to the output markup language document with remaining content occurring after the first partition boundary; and
generating closing tags corresponding to the opening tags that remain in the remaining content in the output markup language document.

16. The non-transitory memory according to claim 15, wherein the operations further comprise formatting the remaining content in the output markup language document as a valid markup language document.

17. The non-transitory memory according to claim 15, wherein the operations further comprise determining the first partition boundary is a tag attribute.

18. The non-transitory memory according to claim 15, wherein the operations further comprise demarcating a change in speaker at the first partition boundary.

19. The non-transitory memory according to claim 15, wherein the operations further comprise sending the remaining content in the output markup language document to a text-to-speech system.

20. The non-transitory memory according to claim 15, wherein the operations further comprise performing a text-to-speech conversion of the remaining content in the output markup language document.

* * * * *